Dec. 25, 1945.  C. BOHLEN, JR  2,391,384
LANDING GEAR FOR TRAILERS
Filed March 17, 1944
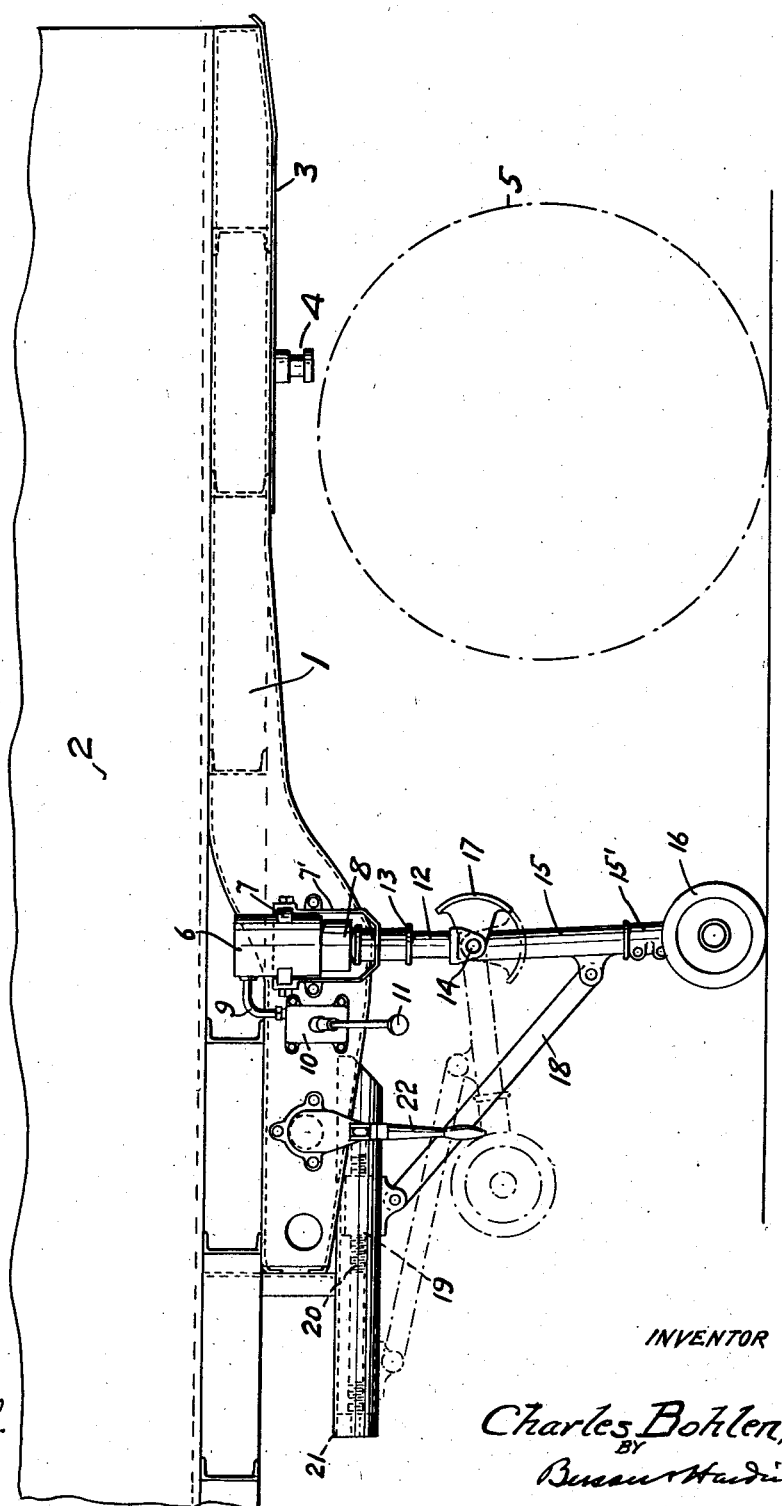
WITNESS:
INVENTOR
Charles Bohlen, Jr.
BY
ATTORNEYS.

Patented Dec. 25, 1945

2,391,384

UNITED STATES PATENT OFFICE 2,391,384

LANDING GEAR FOR TRAILERS

Charles Bohlen, Jr., Jenkintown, Pa.

Application March 17, 1944, Serial No. 526,873

7 Claims. (Cl. 254—86)

This invention relates to a landing gear for trailers and, more particularly, for that type of trailer, known as a semi-trailer, which under tow is supported in part upon the towing vehicle or prime mover and which consequently requires auxiliary supporting means, or landing gear, when detached from its prime mover, as when loading, unloading, and during stopovers.

Heretofore various forms of landing gear have been provided and which have variously operated mechanically and hydraulically. However, such as have been provided heretofore have been open to various practical objections in use.

As is well known, the purpose of the landing gear is to support the end portion of a semi-type trailer when separated from its prime mover and to enable disconnection from and connection to a prime mover. A landing gear is ordinarily put into use when a trailer is dropped for loading or unloading, or at a stopover or terminal point in a system of transportation.

The landing gears heretofore known are sufficiently satisfactory where a given trailer is always handled by the same make and model prime mover and where the landing gear when in use finds a solid, level footing.

However, more often than not the footing is yielding and under the weight of the trailer the landing gear sinks. Again, the surface upon which the trailer stops is irregular and the landing gear foots on a rise or in a depression. Still again, prime movers differ in the height of their trailer supports, or coupling devices.

Under the above conditions the landing gears heretofore known are wanting in range and power and hence are variously objectionable. Thus, by way of example, where the landing gear sinks in the surface upon which it rests, difficulty is found in raising the trailer, especially when loaded, sufficiently to enable the prime mover to get into connecting position. Again, when the trailer supports of a prime mover picking up the trailer is higher than the support of the prime mover which dropped the trailer, difficulty is presented in raising the trailer to effect connection with the prime mover; and when the landing gear initially foots in a depression, difficulty occurs in disconnecting the prime mover.

Now in accordance with this invention there is provided a landing gear so constructed as to be readily manipulated within a wide range for the raising or lowering of a semi-trailer type trailer supported by it to place the trailer for connection or disconnection to or from a prime mover.

Having now indicated, in a general way, the nature and purpose of this invention, I will proceed to a detailed description of a preferred embodiment thereof with reference to the accompanying drawing in which the single figure is a side view of a landing gear embodying this invention, shown in association with a trailer which is sufficiently indicated.

In the drawing 1 indicates a frame upon which the forward end of a trailer body 2 is mounted. The rear end of the trailer body will be supported in any usual manner, as through springs mounted on an axle carrying wheels, not shown. Beneath the forward end of the frame 1 is the usual plate 3 and coupling member 4, for the support and connection of the trailer to a prime mover, a rear wheel of which is indicated at 5.

The landing gear structure shown comprises a hydraulic cylinder 6, mounted in a bracket 7 secured to frame 1, and within which is a piston or ram 8. The upper end of the cylinder is connected by a pipe 9 to a fluid pressure pump located in a casing 10, bolted to the frame 1 and including a supply of fluid, which, for example, may be water, brake fluid, an oil, or the like. A handle 11 extends from the casing for operating the pressure pump to create pressure in the cylinder 6 on the upper end of the piston 8, any usual provision being made, as by a valve, for release of the pressure in cylinder 6 back to the supply of fluid, when desired.

In contact with, but not secured to, the lower end of the piston 8 is a headed end of a shaft 12, which is embraced by a bracket 7', depending from bracket 7. The rod 12 is prevented from dropping away from bracket 7' by its headed end and its upward movement with respect to bracket 7' is limited by an annular flange 13.

Pivoted to the lower end of rod 12, through the medium of a pin 14, is a leg 15 on the lower end of which is mounted, through the medium of a sleeve 15', a small wheel 16, which acts as a foot. Carried by and laterally of leg 15, adjacent to the pivot 14, is a segmental shoe 17.

The leg 15 is pivotally connected to a back brace 18, which in turn is pivotally connected to a nut 19, threaded on a horizontal screw 20, within a casing 21, secured to frame 1. A handle 22 is provided for the rotation of the screw 20, through the medium of gearing (not shown) carried by frame 1, to effect travel of the nut back and forth on the screw.

It will be understood that a landing gear device as illustrated and described may be provided on each side of a trailer for independent or combined operation.

In the operation of the device, for the support of a trailer when disconnected from its prime mover, the weight of the trailer will be taken by the leg 15, rod 12 and piston or ram 8, as shown in full lines in the drawing, it being noted that the piston or ram 8, in extension part way out of the cylinder 6, will be backed by fluid under pressure in the cylinder 6. The leg 15 will be prevented from breaking on its pivotal connection with rod 12 by the back brace 18, which is held by nut 19.

If now it is desired to raise the trailer, such may be accomplished with ease by merely operating the fluid pump by manipulating handle 11 to force more fluid into cylinder 6 and effect further outward extension of piston 8. And when it is desired to lower the trailer, it is only necessary to release fluid from the cylinder 6 to permit retraction of the piston 8 into the cylinder under the load of the trailer.

When the trailer is coupled to a prime mover for towing, the pressure is released from the cylinder 6 and the leg 15 and wheel 16 are drawn up to the traveling position shown in dotted lines in the drawing by the rotation, through the medium of handle 22, of screw 20, and consequent travel of nut 19, which as shown is connected to leg 15 by back brace 18.

As the leg 15 is drawn up into traveling position, the segmental shoe 17 moves to a downwardly facing position, as shown in dotted lines in the drawing, in which position it will strike the ground and prevent damage to the trailer body, or its contents should the trailer become detached from its prime mover in transit. The leg 15 will be prevented from dropping away from bracket 7' by the headed end on rod 12.

As will, it is now believed, be obvious, when a trailer is to be disconnected from its prime mover, the leg 15 will be lowered to supporting position by rotation of screw 20 and fluid then pumped into cylinder 6 to bring the wheel 8 to a bearing and raise the trailer to free the prime mover.

Should the wheel sink into the surface upon which it bears, or should it be desired to connect the trailer to a new prime mover having a higher trailer support than that from which it was disconnected, the trailer may be readily raised by the application of pressure to cylinder 6 to accommodate it to the prime mover; and the trailer may be equally readily lowered to support by a prime mover by release of fluid from the cylinder 6.

It will be noted that the landing gear described is readily accommodated to irregular surfaces, upon which it may bear with respect to opposite sides of the trailer.

Needless to say, various modifications in the structure described above in detail may be made without departing from this invention or the scope of the claims appended hereto.

What I claim and desire to protect by Letters Patent is:

1. In a landing gear for trailers, in combination, a cylinder, a piston in said cylinder, means for supplying fluid under pressure to said cylinder, a rod slidably supported in line with said piston and adapted for end contact therewith but free to move out of contact therewith, a leg pivotally connected to said rod and means for moving said leg about its pivotal connection with said rod.

2. In a landing gear for trailers, in combination, a cylinder, a piston in said cylinder, means for supplying fluid under pressure to said cylinder, a rod slidably supported in line with said piston and adapted for end contact therewith but free to move out of contact therewith, a leg pivotally connected to said rod, means for moving said leg about its pivotal connection with said rod and a ground bearing member carried by said leg.

3. In a landing gear for trailers, in combination, a cylinder, a piston in said cylinder, means for supplying fluid under pressure to said cylinder, a rod slidably supported in line with said piston and adapted for end contact therewith, a leg pivotally connected to said rod, means for moving said leg about its pivotal connection with said rod and a segmental shoe carried by and laterally of said leg adjacent its pivotal connection with said rod.

4. In a landing gear for trailers, in combination, a vertically extending cylinder, a piston in said cylinder, means for supplying fluid under pressure to the top of said cylinder, a rod mounted for vertical movement in line with said piston and adapted for end contact therewith but free to move out of contact therewith, means to limit the vertical movement of said rod, a leg pivotally connected at one end to the end of said rod remote from said piston and means for moving said leg about its pivotal connection with said rod.

5. In a landing gear for trailers, in combination, a vertically extending cylinder, a piston in said cylinder, means for supplying fluid under pressure to the top of said cylinder, a rod mounted for vertical movement in line with said piston and adapted for end contact therewith but free to move out of contact therewith, means to limit the vertical movement of said rod, a leg pivotally connected at one end to the end of said rod remote from said piston, a horizontally extending screw, a nut threaded on said screw, a back brace pivotally connected to said nut and leg and means to rotate said screw.

6. In a landing gear for trailers, in combination, a vertical extending cylinder, a piston in said cylinder, means for supplying fluid under pressure to the top of said cylinder, a bracket extending below said cylinder, a rod having a headed end slidably supported by said bracket and adapted to bear on said piston, a leg pivoted adjacent one end to said rod and means to rotate said leg about its pivotal connection with said leg.

7. In a landing gear for trailers, in combination, a vertically extending cylinder, a piston in said cylinder, means for supplying fluid under pressure to the top of said cylinder, a rod mounted for vertical movement in line with said piston and adapted for end contact therewith, means to limit the vertical movement of said rod, a leg pivotally connected at one end to the end of said rod remote from said piston, means for moving said leg about its pivotal connection with said rod, bearing means carried by the free end of said leg and a segmental shoe carried by and laterally of said leg adjacent its pivotal connection with said rod.

CHARLES BOHLEN, Jr.